United States Patent
Sato

(10) Patent No.: US 8,724,142 B2
(45) Date of Patent: May 13, 2014

(54) IMAGE FORMING DEVICE, PRINTING A PRINT JOB BASED ON A CHANGED PRINT SETTING

(75) Inventor: Hirochika Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 12/642,387

(22) Filed: Dec. 18, 2009

(65) Prior Publication Data

US 2010/0171982 A1 Jul. 8, 2010

(30) Foreign Application Priority Data

Jan. 7, 2009 (JP) ................................ 2009-001635

(51) Int. Cl.
*G06F 3/12* (2006.01)
*G06K 15/00* (2006.01)

(52) U.S. Cl.
USPC .......................................... 358/1.15; 358/1.16

(58) Field of Classification Search
None
See application file for complete search history.

(56) References Cited

U.S. PATENT DOCUMENTS

| | | | |
|---|---|---|---|
| 6,614,546 B1 | 9/2003 | Kurozasa | |
| 6,650,433 B1* | 11/2003 | Keane et al. | 358/1.15 |
| 2004/0169881 A1 | 9/2004 | Sato | |
| 2005/0134876 A1* | 6/2005 | Honma et al. | 358/1.9 |
| 2006/0055968 A1 | 3/2006 | Sato | |
| 2007/0081186 A1 | 4/2007 | Numata | |
| 2007/0165248 A1* | 7/2007 | Utsunomiya et al. | 358/1.1 |

FOREIGN PATENT DOCUMENTS

| | | |
|---|---|---|
| JP | 10-312251 | 11/1998 |
| JP | 2001-236184 | 8/2001 |
| JP | 2005-178074 | 7/2005 |
| JP | 2006-56119 | 3/2006 |
| JP | 2007-105937 | 4/2007 |
| JP | 2007-213566 | 8/2007 |

OTHER PUBLICATIONS

Japanese Office Action dated Dec. 4, 2012 issued during prosecution of related Japanese Application No. 2009-001635.

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

A printing system, in which an image forming device receives a print job containing PDL data and print settings from a printer server for printing, has a problem that the print setting upon printing an image on a print paper can be changed, but the print setting reflected upon rasterizing the PDL data can not be changed. A printing system is provided with an image forming device comprising an information terminal for generating a print job composed of PDL data and print settings, a printer server to store the print job therein, and an image forming device for printing the print job stored in the printer server, the image forming device rasterizing the PDL data to generate a raster image and printing the raster image according to the print setting, wherein the image forming device can change the print setting before rasterizing the PDL data.

5 Claims, 13 Drawing Sheets

FIG.2

| PULL PRINTING SERVICE | COPY | TRANSMIT | BOX |

LIST OF PRINT JOBS

USER A — 1801

| SELECTION | PRIORITY | DOCUMENT NAME | COLOR/MONOCHROME | NUMBER OF COPIES | TIME AND DATE FOR INPUT |
|---|---|---|---|---|---|
| ● | ✓ | PRINT SERVICE SPECIFICATION.doc | COLOR/15 | 1 | 2005/6/15 14:11:12 |
| ● | ○ | WEEKLY REPORT.txt | COLOR/5 | 1 | 2005/6/15 14:13:15 |
| ○ | ○ | BROCHURE FOR COPIER.pdf | COLOR/10 | 1 | 2005/6/15 14:01:06 |
| ○ | ○ | SCHEDULE TABLE OF MAY IN 2005.xls | MONOCHROME/1 | 1 | 2005/6/15 13:45:20 |
| ○ | ○ | WAY OF COOKING DELICIOUS CURRY.ppt | COLOR/3 | 1 | 2005/6/15 13:45:01 |
| ○ | ○ | MAP BROWSING SERVICE.pdf | MONOCHROME/1 | 1 | 2005/6/14 21:12:45 |

[ DELETE ]  [ MAKE PRINT ]  [ RESERVATION ]  [ CANCEL ]   [ LOG OUT ]
   1802          1803            1804              1805        1806

※ DEVICE STATEMENT : IN THE MIDDLE OF PRINTING PRINT JOB OF USER D

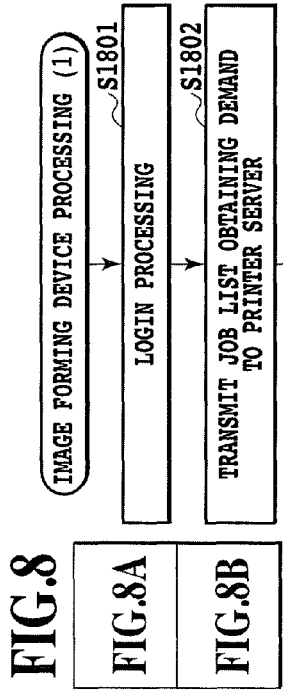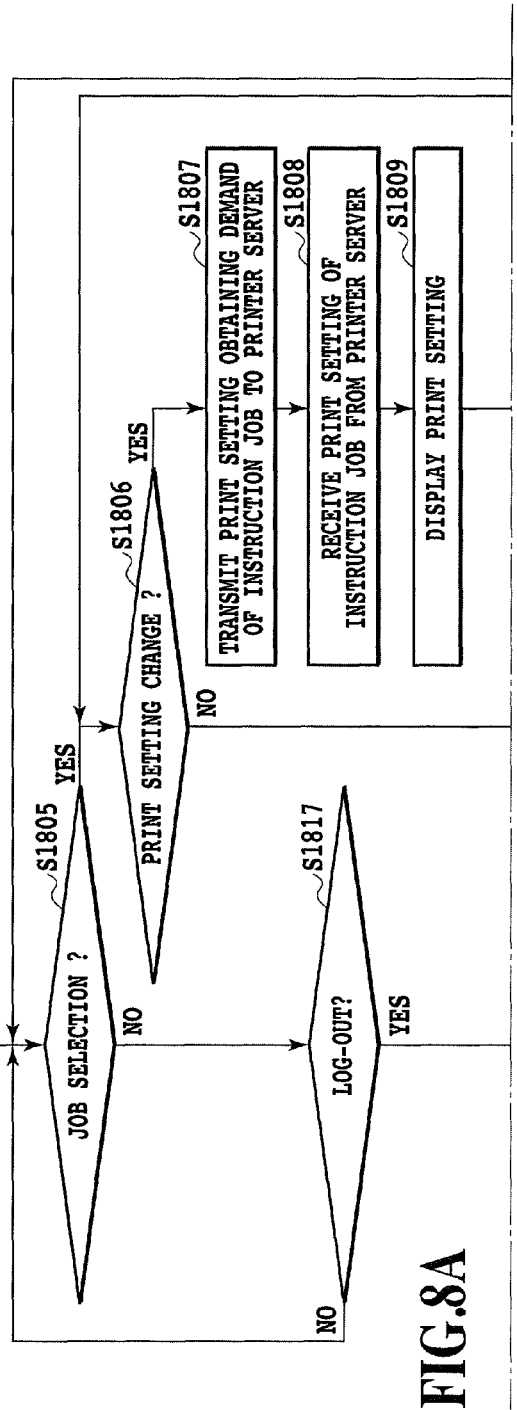
FIG.8

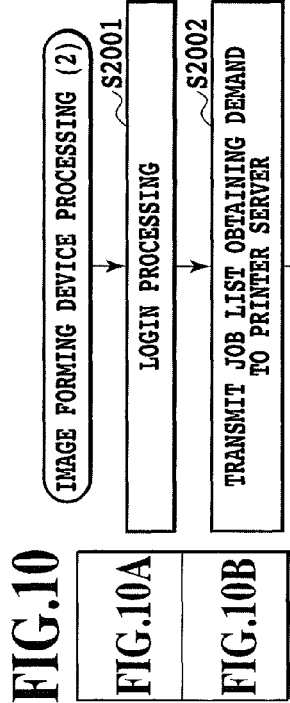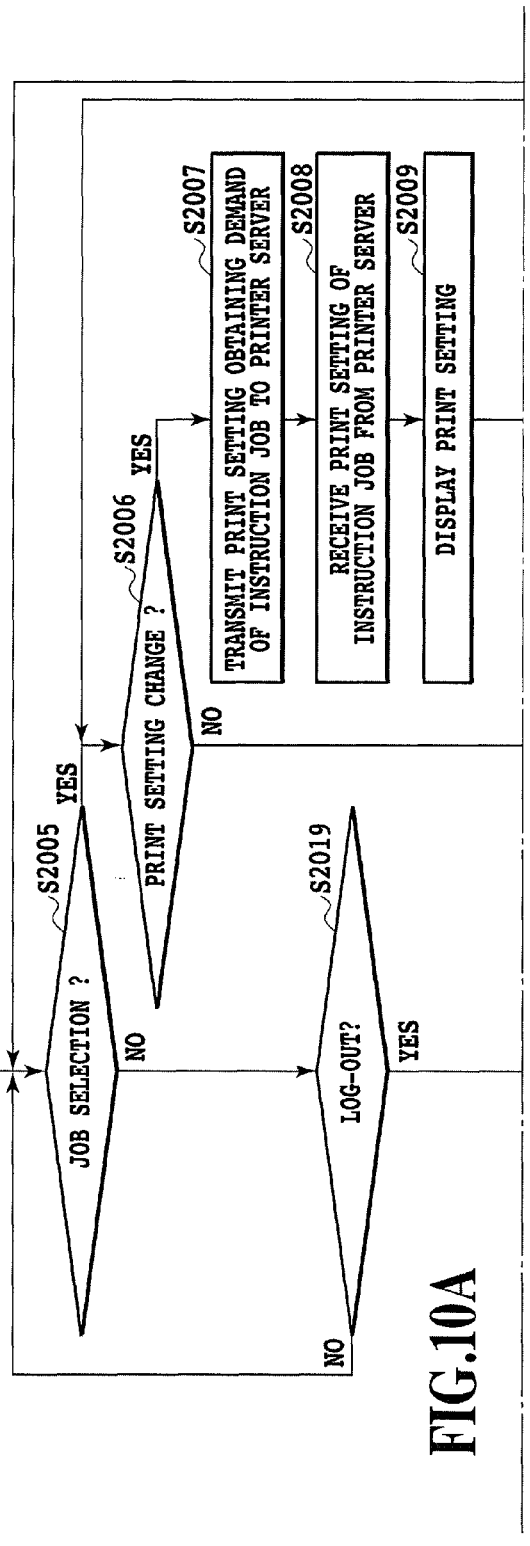
FIG.10
| FIG.10A |
| FIG.10B |

IMAGE FORMING DEVICE, PRINTING A PRINT JOB BASED ON A CHANGED PRINT SETTING

BACKGROUND OF THE INVENTION

1. Field of the Invention

The present invention relates to a printing system comprising an information terminal, a printer server, and an image forming device, a control method and a program of the printing system, and a print medium.

2. Description of the Related Art

There has been conventionally used a print environment where an information terminal such as a PC, a printer server, and an image forming device are connected on a network. For example, as Japanese Patent Laid-Open No. 2007-105937, there is a pull printing system in which a user specifies a target print job among a group of print jobs on an operation panel of the image forming device which the user inputs from the information terminal to the printer server for printing. This printing system has an advantage that the user can print with an image forming device at an outside location at any time even if the information terminal is placed far from the image forming device.

In this printing system, PDL (Page Description Language) data and print settings are in advance contained in a print job which are input to the printer server from the information terminal and such a print job is saved in the printer server. The image forming device rasterizes the PDL data according to the print setting to generate a raster image which is printed on a print paper. The print settings include settings reflected upon rasterizing the PDL data and settings reflected upon printing the raster image on the print paper. The settings reflected upon rasterizing the PDL data include, for example, a print quality setting, an enlargement/reduction setting, an imposition setting, an image size, and the like. The settings reflected upon printing the raster image obtained by the rasterizing include, for example, a print quality setting, a paper size setting, an output tray setting, an enlargement/reduction setting, an imposition setting, a setting for the number of output copies, a sort setting, a double-side setting, a preview setting, and a finishing setting such as stapling or punching.

According to the conventional technology, however, upon specifying a print job in the printer server from the image forming device for printing, the print setting of the print job can not be changed at the image forming device. Therefore, for a user to change the print setting, it is required to once more input a print job in which the print setting has been changed from the information terminal to the printer server.

In regard to this problem, Japanese Patent Laid-Open No. H10-312251 (1998) has proposed the technology that in a push print type printing system in which a raster image generated from PDL data at a printer server and print settings are stored in the printer server and the raster image and the print settings are transmitted to an image forming device, the print settings are changeable. One specific technique is that, after the image forming device receives the raster image and the job settings from the printer server, the job settings are changed on an operation panel in the image forming device. Another is that the print settings are changed on an operation panel of the printer server, and then the raster image and the changed print settings are transmitted to the image forming device.

However, according to Japanese Patent Laid-Open No. H10-312251 (1998), even if any of both the techniques is adopted, the print settings are supposed to be changed after the PDL data are rasterized in the printer server. Therefore, this patent document has a problem that the print settings upon printing the image on a print paper can be changed, but the print settings reflected upon rasterizing the PDL data can not be changed. When the print settings are forcibly changed, and for example, the raster image after its rasterization is enlarged/reduced, an image quality such as a font is degraded. To enlarge/reduce the raster image without degrading the image quality such as the font, it is required to change the print setting of the enlargement/reduction at rasterizing.

In a case of changing the print setting in the image forming device, the raster image is temporarily spooled into a HDD (Hard Disk Drive) in the image forming device and thereafter, the print setting is changed therein. Therefore, all the raster images are read out again from the HDD at the time of printing. Because of it, there is another problem that a throughput from a point of receiving the print job to a point of completing the print is degraded, thus making the high speed processing difficult. Further, since a larger storage capacity is inevitably needed, it is difficult to change the print setting in the image forming device with a low capacity of the HDD.

In a case of changing the print setting in the printer server, a user is required to operate the operation panel in the printer server. However, this technique does not allow an advantage of the pull printing system to be realized. That is, this technique is established assuming that the printer server is placed near the image forming device and therefore, is not a practical and effective measure.

SUMMARY OF THE INVENTION

The present invention is provided with the following construction to solve the problems described above.

A printing system according to the present invention comprises an information terminal for generating a print job composed of PDL data and print settings, a printer server for storing the print job, and an image forming device for printing the print job stored in the printer server, the image forming device rasterizing the PDL data to generate a raster image and printing the raster image according to the print setting, wherein the image forming device can change the print setting before rasterizing the PDL data.

According to the present invention, a user can change the print setting of the print job before rasterizing the PDL data in the image forming device. Therefore, it is possible to appropriately reflect a change of the print setting which the user intends to make on the print result.

Further, since the image forming device receives the PDL data after changing the print setting, it is not necessary to store all the PDL data in the HDD of the image forming device. It is therefore possible to apply the present invention also to the image forming device with a low capacity of the HDD. At the same time, it is also possible to speed up the printing because of the reduced number of the times of access to the HDD.

Further features of the present invention will become apparent from the following description of exemplary embodiments (with reference to the attached drawings).

BRIEF DESCRIPTION OF THE DRAWING

FIG. 2 is a diagram showing an example of a job operation screen displayed on a display unit in an image forming device according to the present invention;

FIG. 8 is a diagram showing the relationship between FIG. 8A and FIG. 8B;

FIG. 8A is a flowchart showing the procedure of the changing processing for print settings in an image forming device 103 according to the first embodiment of the present invention;

FIG. 10 is a diagram showing the relationship between FIG. 10A and FIG. 10B;

FIG. 10A is a flowchart showing the procedure of the changing processing for print settings in an image forming device 103 according to the second embodiment of the present invention;

DESCRIPTION OF THE EMBODIMENTS

Hereinafter, the best mode of carrying out the present invention will be explained with the drawings.
(First Embodiment)

Figure 1:
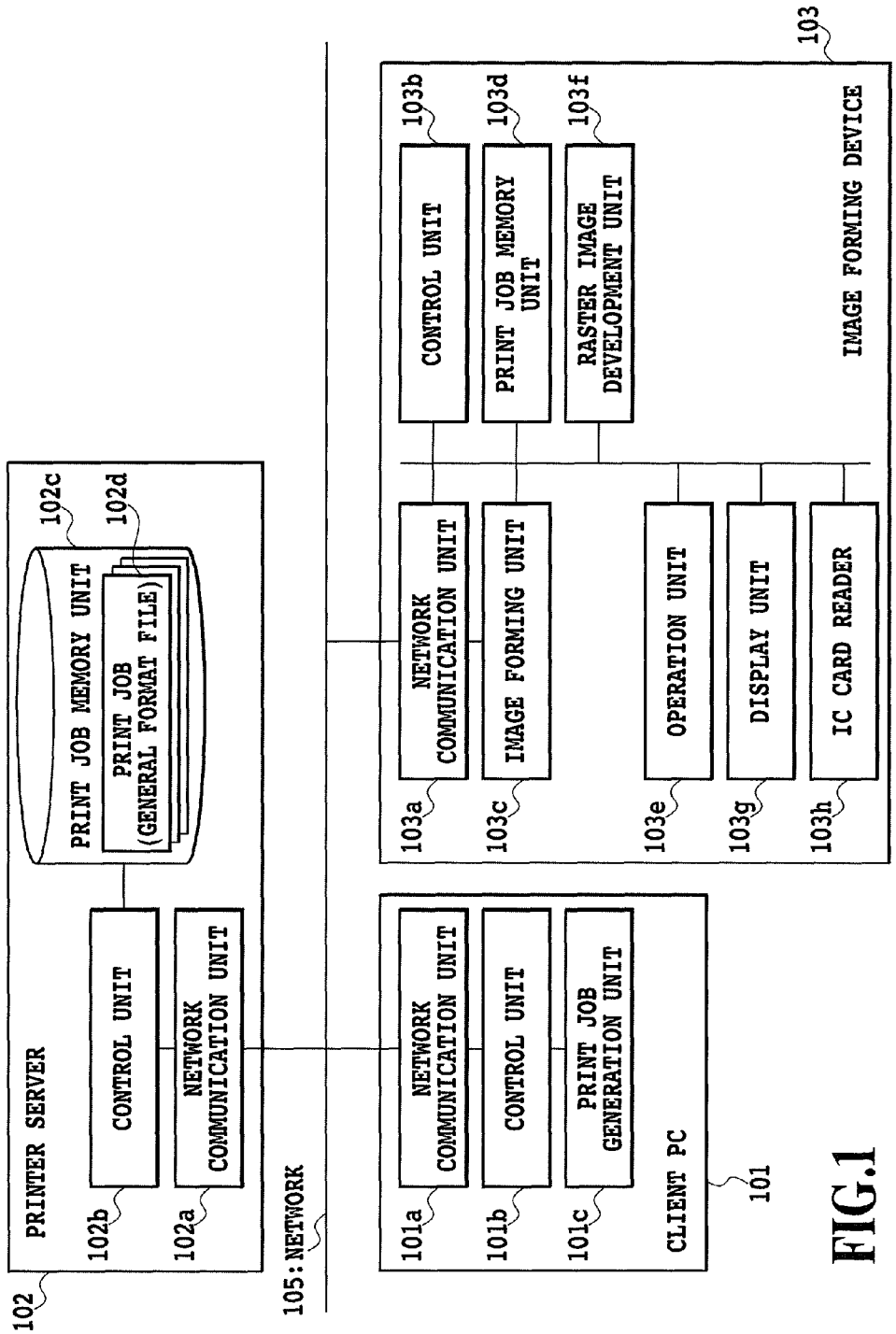
FIG. 1 is a system construction diagram showing the entire construction of a pull printing system according to a first embodiment of the present invention.

FIG. 1 is a system construction diagram showing the entire construction of a printing system (pull printing system) according to a first embodiment of the present invention. Hereinafter, the construction of the system and the procedure in the pull printing processing will be explained. It should be noted that, in the present specification, "pull printing processing" means the processing in which an image forming device such as a printer obtains print data existing in a storage device such as a printer server through a network for printing.

As shown in FIG. 1, the pull printing system is constructed of a client PC 101 as an information terminal device, a printer server 102 as an information processing device and an image forming device 103. These devices are connected through a network 105 to each other. The network 105 is a line network such as a LAN or wireless LAN, and the Internet. The network may be formed in any kind and is not limited to a specific kind.

First, in a case of registering a print job from the client PC 101 to the printer server 102, the print job is generated in a print job generation unit 101c of the client PC. The print job is composed of PDL data and print settings. A control unit 101b is configured to transmit the generated print job via a network communication unit 101a and the network 105 to the printer server 102. The control unit 101b is configured to control processing operations of respective construction units at the time of registering the print job.

It should be noted that, in a case where the image forming device 103 for pull printing is in advance determined, the control unit 101b may be configured to produce PDL data depending on the device kind by the client PC 101, transmitting the PDL data to the printer server 102.

It should be noted that the client PC 101 includes a CPU, a ROM, a RAM, an external storage device (HDD) and the like, and a function of each of the above units is realized by reading out and executing programs stored in the HDD on the RAM by the CPU.

When the network communication unit 102a in the printer server 102 receives a print job 102d from the client PC 101, the printer server 102 registers the print job 102d in a print job memory unit (memory unit) 102c. The control unit 102b controls a processing operation of each construction unit at the time of registering the print job.

The printer server 102 includes a CPU, a ROM, a RAM, an external storage device (HDD) and the like and realizes a function of each of the above units by reading out and executing programs stored in the HOD on the RAM by the CPU.

Next, the print job saved in the printer server 102 is pull-printed from the image forming device 103. At this time, a user receives a user authentication for using the image forming device. That is, in the image forming device 103, the login processing for confirming the use authority of the user is executed. This login processing is executed through an IC card reader 103h or an operation unit 103e.

A control unit 103b transmits the user authentication information input through a network communication unit 103a from the IC card reader 103h or the operation unit 103e to the printer server 102. The control unit 103b obtains a list of print jobs printable by a user from the printer server 102 and displays it on a display unit 103g. The user selects a job for a print using the operation unit 103e. Then, the control unit 103b downloads the instructed print job from the printer server 102 to a print job memory unit 103d (memory unit).

Finally, the control unit 103b develops the print job to a raster image at a raster image development unit 103f and thereafter, forms (makes a print of) the image on a print paper at an image forming unit 103c.

The control unit 103b is thus configured to control the processing operation of each construction unit at the time of executing the print processing. It should be noted that the image forming device 103 includes a CPU, a ROM, a RAM, an external storage device (HOD) and the like, and realizes a function of each of the above units by reading out and executing programs stored in the HOD on the RAM by the CPU.

In the printer server 102, the control unit 102b transmits a list of print jobs printable by a user to the image forming device 103 based upon the user authentication information received at the network communication unit 102a. Further, when the control unit 102b receives an instruction of the print job to be printed and device information of the image forming device 103, the control unit 102b transmits the instructed print job 102d to the image forming device 103. In this way, the control unit 102b is configured to obtain the print job 102d based upon the user authentication information from the print job memory unit 102c and besides, control the processing of each construction unit for the print processing.

FIG. 2 shows an example of a job operation screen displayed in the operation unit 103e of the image forming device 103 after its user authentication. A user who logs in the image forming device 103 performs a job operation such as selecting a print job on this screen, printing a target document.

Figure 3:
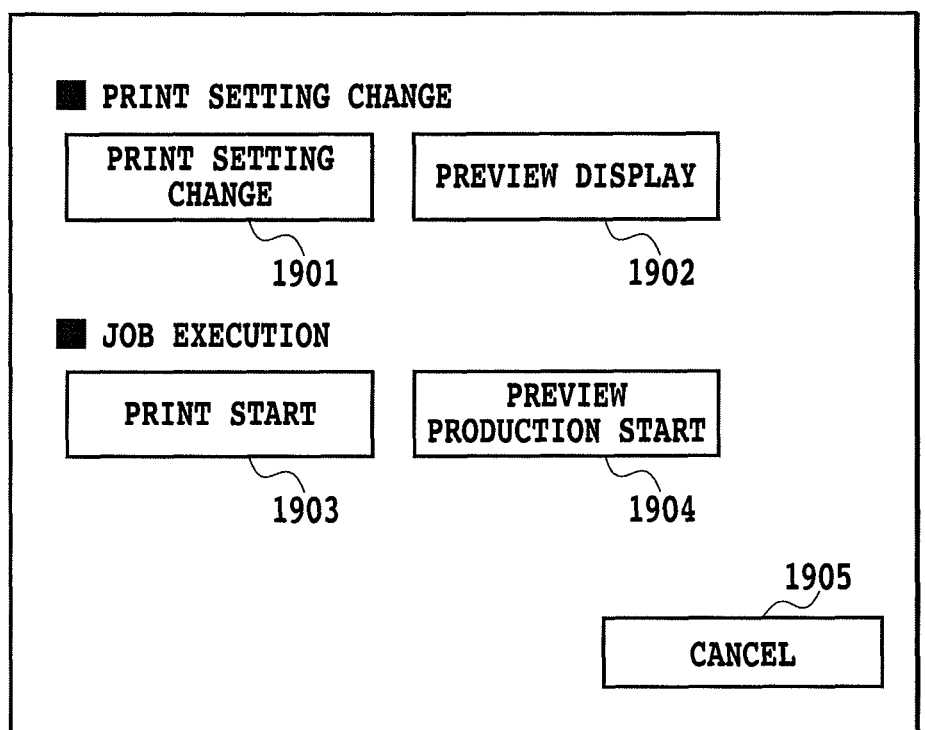
FIG. 3 is a diagram showing an example of a print setting screen displayed on the display unit in the image forming device according to the present invention.

In FIG. 2, number 1801 is a display unit for a list of print jobs, which is used for displaying the list of the print jobs for a user saved in the printer server 102. The user can select an arbitrary print job with methods such as a method of touching the print job displayed on the display unit 1801 for the list of the print jobs in a touch pen or in a finger. Number 1802 is a deletion button which is the button for deleting or eliminating the selected print job from the printer server 102. Number 1803 is a print execution button. When a user selects this button 1803, a print setting screen 1900 to be explained in FIG. 3 is displayed. Number 1804 is a reservation button which is a button for making a reservation for execution of a print of the selected print job. When a user can not immediately execute its print job, for example, in a case the other user is printing a large number of documents or in a case of error occurrence, this button is used. By making the reservation of the execution of the print job, it is not required for a user to wait for the print completion of the other user or completion of a recovery operation for the error before the image forming device 103. After making the reservation, a user logs out once and the user may once more log in after the print completion of the other user or the recovery of the error state to execute the print processing. Number 1805 is a cancellation button which is a button for lifting selection of the print job. Number 1806 is a logout button which is a button for instructing the logout from the image forming device 103.

Figure 4:
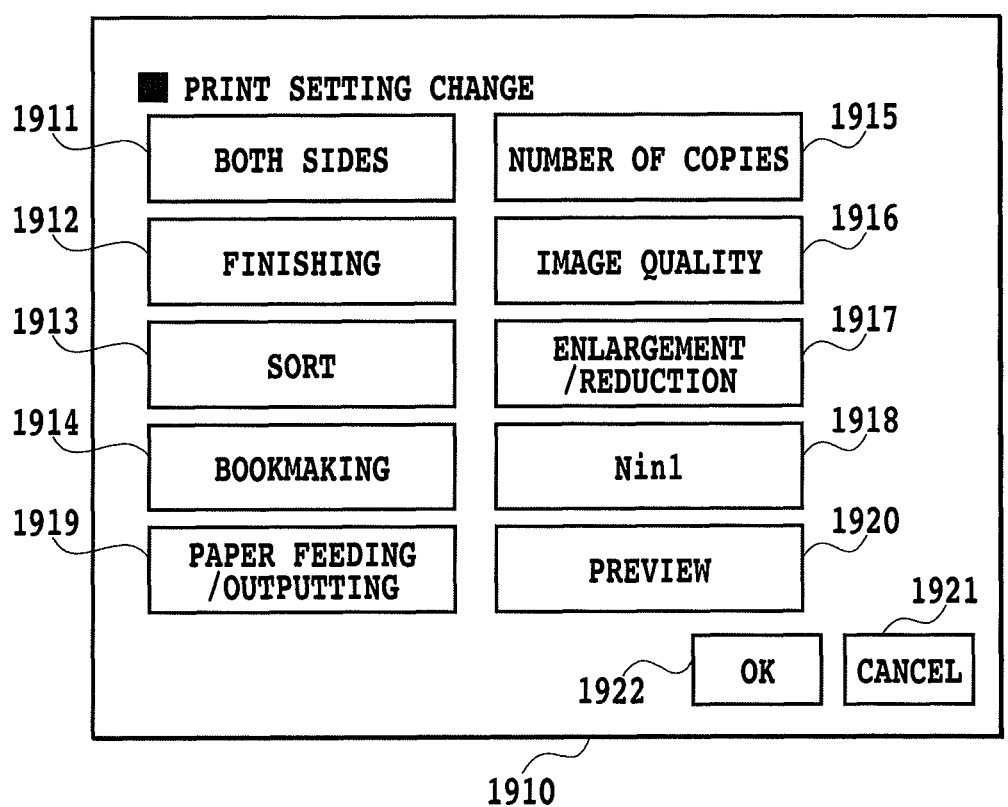
FIG. 4 is a diagram showing an example of a print setting changing screen displayed on the display unit in the image forming device according to the present invention.

FIG. 3 shows an example of the print setting screen 1900 displayed in a case of selecting the print execution button 1803 in the job operation screen in FIG. 2. When a print setting changing button 1901 in the print setting screen 1900 is selected, a print setting changing screen 1910 to be explained in FIG. 4 is displayed, making it possible to change the print setting of the print job selected on the job operation screen. When a print start button 1903 is selected, it is possible to start a print of the print job according to the content of the print setting changed on the print setting changing screen 1910. In a case where the content of the print setting is not changed on the print setting screen 1910, printing is made according to the content of an initial print setting of the print job stored in the printer server 102.

Even in a case where production of a preview is not selected in the initial print setting, when a preview production start button 1904 in the print setting screen 1900 is selected, the print job stored in the printer server 102 is executed in a preview production mode. In the preview production mode, the control unit 103b is configured to rasterize PDL data and store the obtained raster image as a preview image in the memory in the image forming device 103. In addition, it is possible to confirm the preview image of the print job on the preview screen (not shown) displayed in a case of selecting a preview display button 1902. It should be noted that, in a case where the raster image is not stored as the preview image in the memory in the image forming device 103, the preview display button 1902 is in a selection impossible state by a shaded display or the like and the login user can not select the preview display button 1902. The control unit 103b is configured in such a manner that the user can select only any one of the print start button 1903 and the preview production start button 1904. When a cancellation button 1905 is selected, the screen is returned back to the job operation screen.

Figure 5:
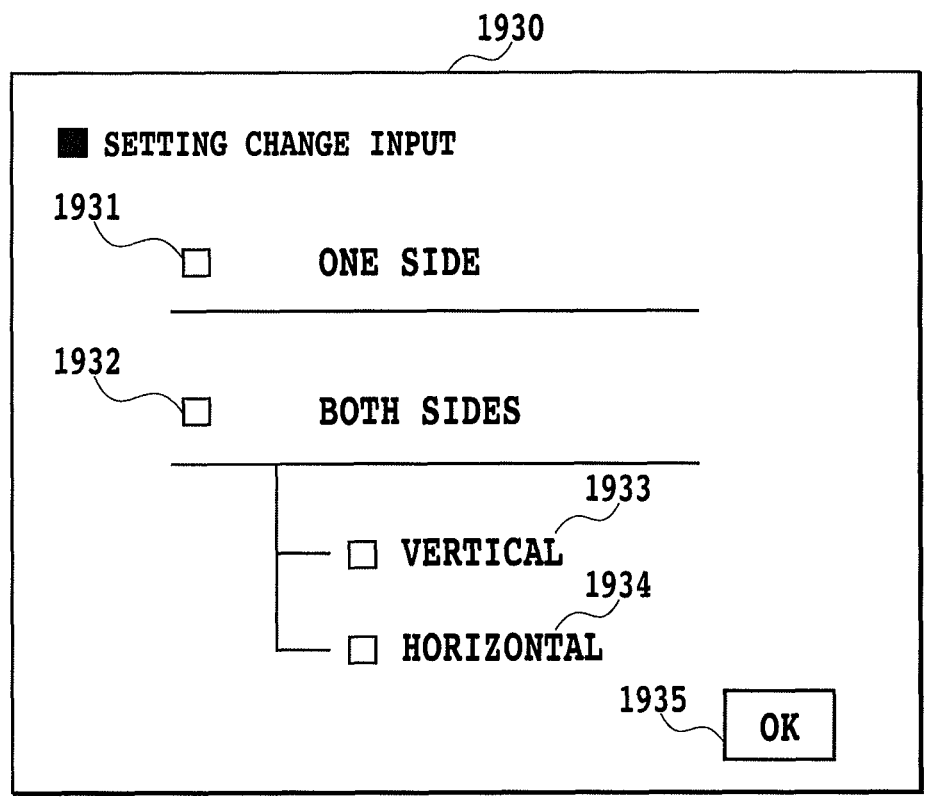
FIG. 5 is a diagram showing an example of a print setting changing input screen displayed on the display unit in the image forming device according to the present invention.

FIG. 4 shows an example of the print setting changing screen 1910 displayed in a case of selecting the print setting changing button 1901 in the print setting screen 1900 in FIG. 3. When each of various print setting buttons 1911 to 1920 is selected, a setting changing input screen is displayed for each print setting item, therefore, making it possible to change the content of each print setting item. For example, when a double-side print button 1911 for making a setting of a double-side print is selected, a setting changing input screen 1930 as shown in FIG. 5 is displayed. On the setting changing input screen 1930, it is possible to set any of one side printing or both side printing, and in a case of the both side printing, further settings of vertical and horizontal are possible. The setting changing input screen for each of the other setting items is omitted in illustration, but the setting changing input screen similar to that in a case of "double-side" is displayed. That is, in a finishing setting 1912, a staple setting, a punch setting or the like can be set and further, it is also possible to set a position of the staple or punch. In a sort setting 1913, it is possible to set sort output or group output. In a bookmaking setting 1914, it is possible to set bookmaking output. In a copy number setting 1915, the number of copies to be printed can be set. In an image quality setting 1916, image quality parameters (gamma value, monochrome/color output and the like) can be set. In an enlargement/reduction setting 1917, it is possible to set at which of PDL data rasterizing time and printing time the enlargement/reduction setting should be made. In a Ninl setting 1918, it is possible to set at which of PDL data rasterizing time and printing time the Ninl setting for reducing N sheets of manuscript images and printing the reduced images on one print paper can be set. In a sheet feeding/outputting setting 1919, a print paper to be fed or an output tray of the print paper can be set. In a preview setting 1920, it is possible to set whether or not the preview is produced before making a print. Here, it should be understood that the various print setting items in the figure are shown as an example to the end and the content of each print setting item is also arbitrarily set. When an OK button 1922 is selected, the content after changing the print setting becomes effective. When a cancellation button 1921 is pressed down, the setting changed content is cancelled and the screen is returned back to the print setting screen 1900.

(Processing in Client PC 101)

Figure 6:
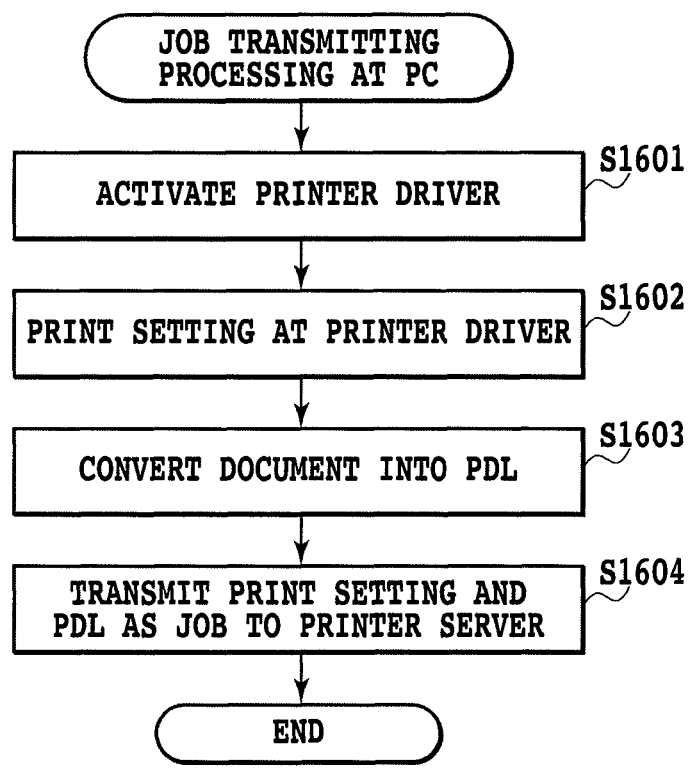
FIG. 6 is a flowchart showing the procedure of the processing in a client PC in a pull printing system according to the present invention.

FIG. 6 is a flowchart showing the procedure in the transmitting processing of the print job in the client PC 101 according to the first embodiment.

First, a preparation for inputting a print job of a target document (document which the user produces in a document production application or the like) to the printer server 102 is performed. That is, at step 1601 the client PC 101 activates a printer driver installed in the client PC 101.

Next, at step 1602 the client PC 101 makes print settings of the print job by the printer driver. The print settings are made based upon input from a user. The print settings include two kinds of the settings, one reflected at the time of rasterizing PDL data at the image forming device 103 and the other reflected at the time of making a print on a print paper. The setting reflected at the time of rasterizing the PDL data includes, for example, an image quality setting, an enlargement/reduction setting, an imposition setting, an image size setting and the like. The setting reflected at the time of making the print on the print paper includes, for example, an image quality setting, a print paper size setting, an output tray setting, an enlargement/reduction setting, an imposition setting, an output copy number setting, a sort setting, a double-side setting, a preview setting, a finishing setting represented by staple or punch, and the like.

Next, at step 1603 the client PC 101 converts the document which a user desires to print into PDL data.

Finally at step 1604 the printing setting set at step 1602 and the PDL data converted at step 1603 are transmitted as the print job to the printer server 102.

(Processing in the Printer Server)

Figure 7:
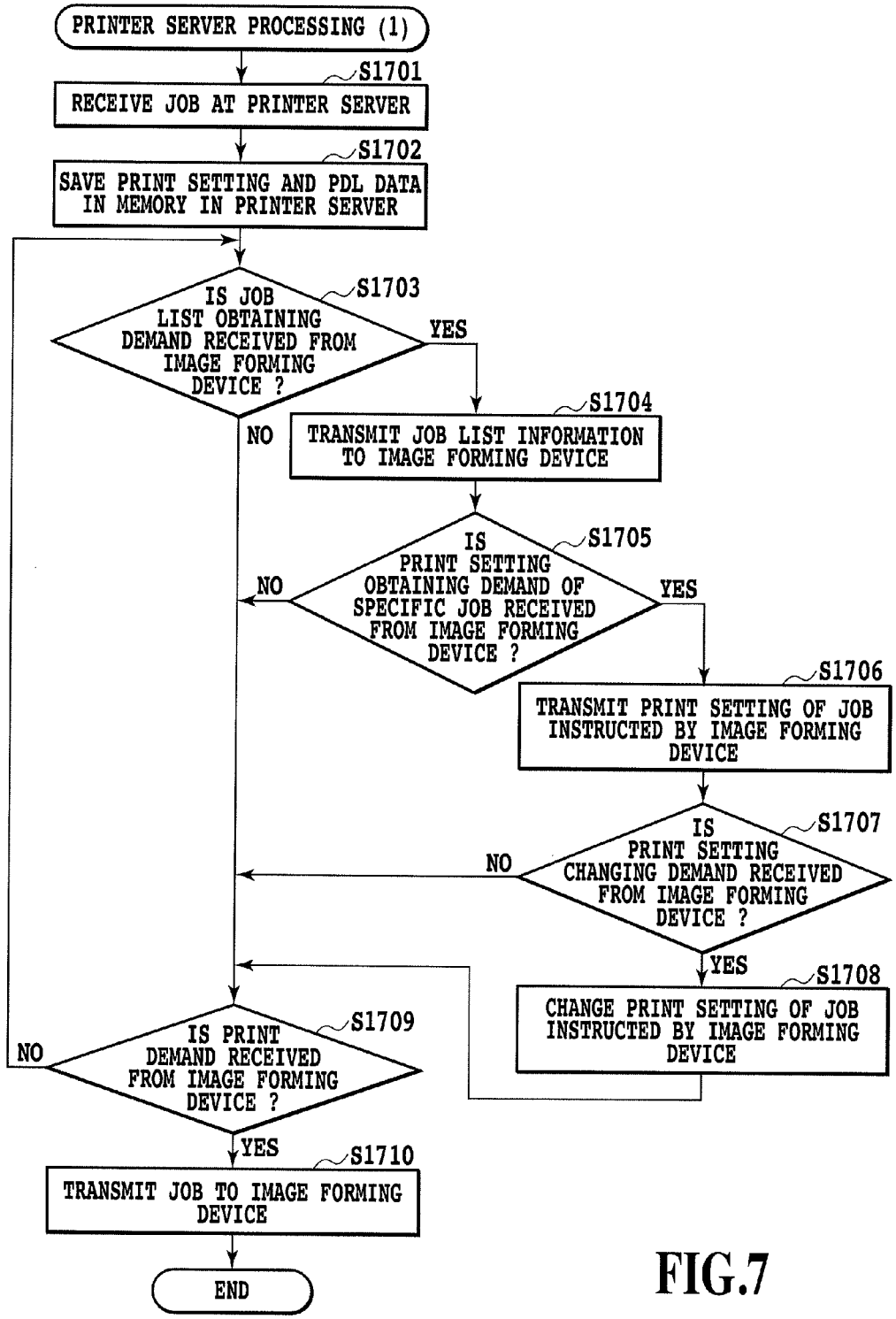
FIG. 7 is a flowchart showing the procedure of the processing in a printer server 102 according to the first embodiment of the present invention.

FIG. 7 is a flow chart showing the procedure in the printer server 102 according to the first embodiment.

First, at step 1701 the printer server 102 receives the print job transmitted from the client PC 101 at the network communication unit 102*a*.

Next, at step 1702 the control unit 102*b* is configured to store the received print job in the print job memory unit 102*c*. That is, the print setting as the print job and the PDL data are stored in a memory unit (memory in this case is preferably an involatile memory in which written data are not deleted even in no power supply state) in the printer server.

Next, at step 1703 the control unit 103*b* determines whether or not a demand for obtaining a list of the print jobs (job list) is received from the image forming device 103. In a case of receiving the demand, the process goes to step 1704 and in a case of not receiving the demand, the process goes to step 1709.

At step 1704, the control unit 102*b* transmits the list of the print jobs stored in the print job memory unit 102*c* through the network communication unit 102*a* to the image forming device 103. Next, at step 1705 the control unit 102*b* determines whether or not a print setting obtaining demand of a specific print job is received from the image forming device 103. In a case of receiving the demand, the process goes to step 1706 and in a case of not receiving the demand, the process goes to step 1709.

At step 1706 the control unit 102*b* reads out the print setting of the print job corresponding to the received print setting obtaining demand from the print job memory unit 102*c* and transmits the read print setting through the network communication unit 102*a* to the image forming device 103.

Next, at step 1705 the control unit 102*b* determines whether or not a print setting changing demand is received from the image forming device 103. In a case of receiving the demand, the process goes to step 1708 and in a case of not receiving the demand, the process goes to step 1709.

At step 1708 the control unit 102*b* changes the print setting of the print job instructed by the image forming device 103 according to the content of the received print setting changing demand.

At step 1709 the control unit 102*b* determines whether or not a print demand is received from the image forming device 103. In a case of receiving the demand, the process goes to step 1710 and in a case of not receiving the demand, the process returns back to step 1703.

At step 1710 the control unit 102*b* transmits the demanded print job to the image forming device 103. When the print setting is changed at step 1708 at this time, the control unit 102*b* transmits the print job containing the print setting in which the change is reflected.

(Print Setting Changing Processing in Image Forming Device)

Figure 8B:
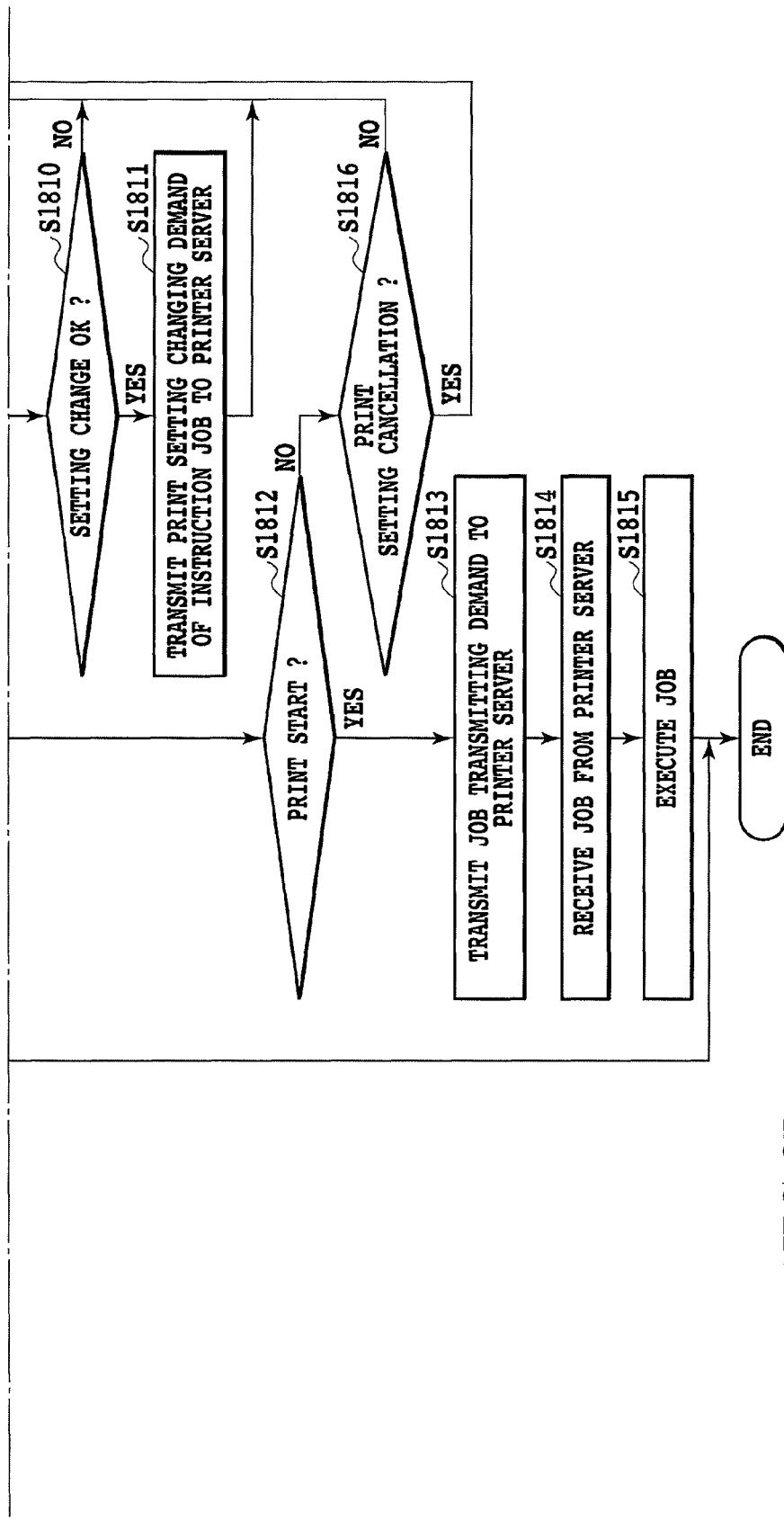
FIG. 8B is a flowchart showing the procedure of the changing processing for print settings in an image forming device 103 according to the first embodiment of the present invention.

FIG. 8A and FIG. 8B are flow chart showing the procedure of the changing processing in the image forming device 103 according to the first embodiment.

First, at step 1801 the control unit 102*b* executes login processing for confirming use authority of a user. The content of the login processing may include a method of reading user information stored in a user's IC card using an IC card reader 103*h* or a method of inputting information such as user ID or pass word at the operation unit 103*e* by a user. Besides, the well-known authentication technology is applicable. When the login processing is completed and the user's use authority is confirmed, the process goes to step 1802.

At step 1802, for obtaining a job list of a user who has logged in, the control unit 103*b* in the image forming device requests a job list obtaining demand to the printer server 102.

At step 1803, the image forming device 103 receives the demanded job list through the network communication unit 103*a* from the printer server 102.

Next, at step 1804 the control unit 103*b* displays the content of the received job list on the display unit 103*g* through the job list on the job operation screen shown in FIG. 2.

Next, at step 1804 the control unit 103*b* determines whether or not a login user selects any job from the job list on the job operation screen. In a case of selecting the job, the process goes to step 1806 and in a case of not selecting the job, the process goes to step 1817.

At step 1817 the control unit 103*b* determines whether or not the login user logs out by selection of a logout button 1806. When the login user logs out, the process ends and when the login user does not log out, the process returns back to step 1805.

At step 1806 the control unit 103*b* determines whether or not the login user selects the print setting changing button 1901 on the print setting screen 1900 shown in FIG. 3. When the login user selects it, the process goes to step 1807 and when the login user does not select it, the process goes to step 1812.

At step 1807, the control unit 103*b* transmits a print setting obtaining demand for obtaining print settings of the print job selected by the login user to the printer server 102.

Next, at step 1808 the image forming device 103 receives the print settings demanded at step 1807 from the printer server 102.

At step 1809 the control unit 103*b* displays the content of the print settings. Here, the content to be displayed is determined according to selection of the login user. That is, the login user selects a setting desiring to change this time among the print settings through the various print setting buttons 1911 to 1920 in the print setting changing screen 1910, and the control unit 103*b* displays a setting changing input screen of the print setting item corresponding to the selected button. The login user changes the content of the setting into a desired content on the displayed setting changing input screen. For example, when a user desires to change from the content of the initial print setting which is one side printing to both side printing, the user selects the print setting button 1911 of "double sides" to display the setting changing input screen 1930. In addition, the user deletes a check mark in a check box 1931 in "one side" in the setting changing input button 1930 and further, puts a check mark in a check box 1932 of "double sides". The user puts a check mark in any of a check box 1933 and a check box 1934 depending on vertical or horizontal. When the input is completed, an OK button 1935 is selected to be back to the print setting changing screen 1910. In this way, the operation for changing the setting content from "one side" as the initial setting content to "double sides" is completed. It should be noted that, the change from the one side to double side explained here is a change of the print setting reflected at printing. However, since the present invention can change the print setting before rasterizing the data, the print setting such as an image quality setting reflected at rasterizing can be changed likewise.

When a login user desires to change the other setting changing item, the corresponding button is selected from the print setting buttons 1912 to 1920 to perform the similar operation. When the other setting changing item is not present, the OK button 1922 is selected from the print setting changing screen 1910.

Next, At step 1810 the control unit 103b determines whether or not the login user selects the OK button 1922 on the print setting changing screen 1910. When the login user selects it, the process goes to step 1811 and when the login user does not select it (that is, in a case where the cancellation button 1921 is selected), the process returns back to step 1806.

At step 1811 the control unit 103b transmits a print setting changing demand to the printer server 102 in such a manner as to reflect a new changed content to the content of the print setting in the selected print job, and the process goes back to step S1806.

At step 1812 the control unit 103b determines whether or not the login user selects the print start button 1903 on the print setting screen 1900. When the login user selects it, the process goes to step 1813 and when the login user does not select it, the process goes to step 1816.

At step 1816 the control unit 103b determines whether or not the login user selects the cancellation button 1905 on the print setting screen 1900. When the login user selects it, the process goes back to step 1805 and when the login user does not select it, the process goes back to step 1806.

At step 1813 the control unit 103b transmits a print job transmitting demand to the printer server 102. Followed by it, at step 1814 the control unit 103b receives a print job in response to the transmitting demand from the printer server 102. The print setting contained in the print job received from the printer server at this stage is the print setting to which the aforementioned change is, if it is made, reflected.

At step 1815 the control unit 103b executes the execution processing of the received print job. The execution processing of the print job will be explained with reference to FIG. 11.

(Print Job Execution Processing in Image Forming Device)

Figure 11:
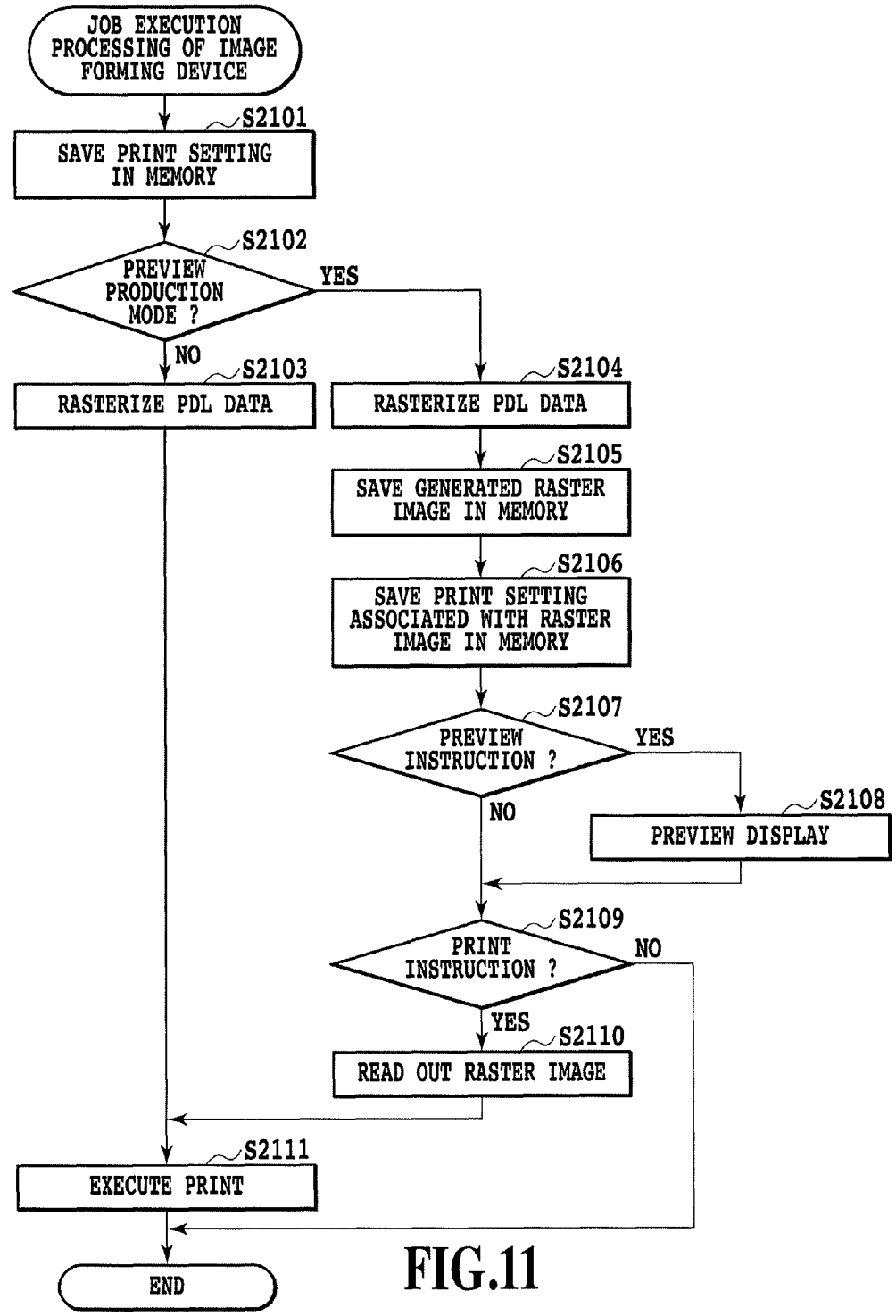
FIG. 11 is a flowchart showing the procedure of the execution processing for a print job in the image forming device 103 according to the first embodiment of the present invention.

FIG. 11 is a flow chart showing the procedure of the execution processing of the print job in the image forming device 103 according to the first embodiment.

At step 2101, the control unit 103b in the image forming device 103 stores the content of the print setting contained in the print job received from the printer server 102 in the memory. Here, the print setting to be stored is, if the print setting is changed at the previous print setting changing processing, the print setting to which the change is reflected, and if not, the initial print setting already stored in the printer server 102 before the print setting changing processing.

At step 2102 the control unit 103b determines whether or not production of a preview is selected in the print setting. When the production of the preview is selected, the processing becomes a preview production mode and the process goes to step 2104, and when it is not selected, the processing becomes a print mode, the process goes to step 2103.

At step 2103, the control unit 103b is configured to rasterize PDL data at the raster image development unit 103f. Further, the process goes to step 2111, wherein the control unit 103b is configured to print the raster image obtained by the rasterizing on a print paper.

On the other hand, as a result of the determination at step 2102, when the processing is the preview production mode, at step 2104 the control unit 103b is configured to rasterize the PDL data at the raster image development unit 103f.

The process goes to step 2105, wherein the control unit 103b stores the raster image obtained by the rasterizing in the memory and thereafter, associates the print setting stored in the memory at step 2101 with the raster image, which is stored in the memory (step 2106).

Next, the process goes to step 2107, wherein the control unit 103b determines whether or not the login user selects the preview display button 1902. When the login user selects it, the process goes to step 2108 and when the login user does not select it, the process goes to step 2109.

At step 2108, the control unit 103b reads out the raster image stored in the memory as the preview image and displays it in the display unit 103g on a preview screen (not shown).

At step 2109, the control unit 103b determines whether or not the login user selects the print start button 1903. When the login user selects it, the process goes to step 2110 and when the login user does not select it, the execution processing of the print job ends.

At step 2110, the control unit 103b reads out the raster image from the memory and the process goes to step 2111.

According to the present invention in which the print setting is changed before rasterizing, it is not required to store all the PDL data in a large capacity of a memory such as HDD and then rasterize them in the rasterizing processing of the PDL data at step 2103 and step 2104. First, the control unit 103b executes the receiving processing of the PDL data and the development processing in the raster image development unit 103f asynchronously. The control unit 103b sequentially accumulates the PDL data received at the network communication unit 103a in the memory called a receiving buffer and transfers them to the raster image development unit 103f. Here, the control unit 103b, only in a case where the development processing speed is slower than the receiving processing speed and therefore, the PDL data can not be stored in the receiving buffer, stores the PDL data in the HDD. That is, only the PDL data which can not be accumulated in the receiving buffer are temporarily stored in the HDD for swapping. The control unit 103b, in a state where the processing at the raster image development unit 103f is advanced and the swapped PDL data can be processed at the raster image development unit 103f, reads out the PDL data and transfers them to the raster image development unit 103f. In this way, the control unit 103b is configured to save only a quantity of the PDL data exceeding the storage capacity of the receiving buffer in the HDD. Therefore, the present invention can be applied even to the image forming device where the capacity of the HDD is not sufficient or the HDD itself is not provided. Further, since the number of the times of access to the HOD is reduced, the throughput of the print processing is also improved.

It should be noted that in the present embodiment, at step 1708 the control unit 102b in the printer server 102 changes the print setting according to the content of the print setting changing demand received from the image forming device 103. Therefore, in regard to a print demand after the above print setting changing demand from the image forming device 103, the control unit 102b in the printer server 102 is to transmit the print job containing the print setting to which the change is already reflected. In consequence, in a case of using the print job in which the print setting is changed once as it is for reprinting, only if a user selects the print start button 1903, it is possible to make a print by reusing the print job in which the print setting is already changed. In this way, as long as the print job is not removed from the printer server 102, the print setting once changed can be effectively used. It should be noted that removal of the print job which has become unnecessary can be easily made by selecting the deletion button 1802 on the job operation screen in FIG. 2.

(Second Embodiment)

An entire construction of a pull printing system according to a second embodiment in the present invention is similar to that of the first embodiment. A difference in the present embodiment from the first embodiment is in the processing in the printer server 102 and the image forming device 103 at the time of changing the print setting. Hereinafter, the second embodiment will be explained focusing on a difference point thereof from the first embodiment with reference to FIG. 9, FIG. 10A and FIG. 10B.

Figure 9:
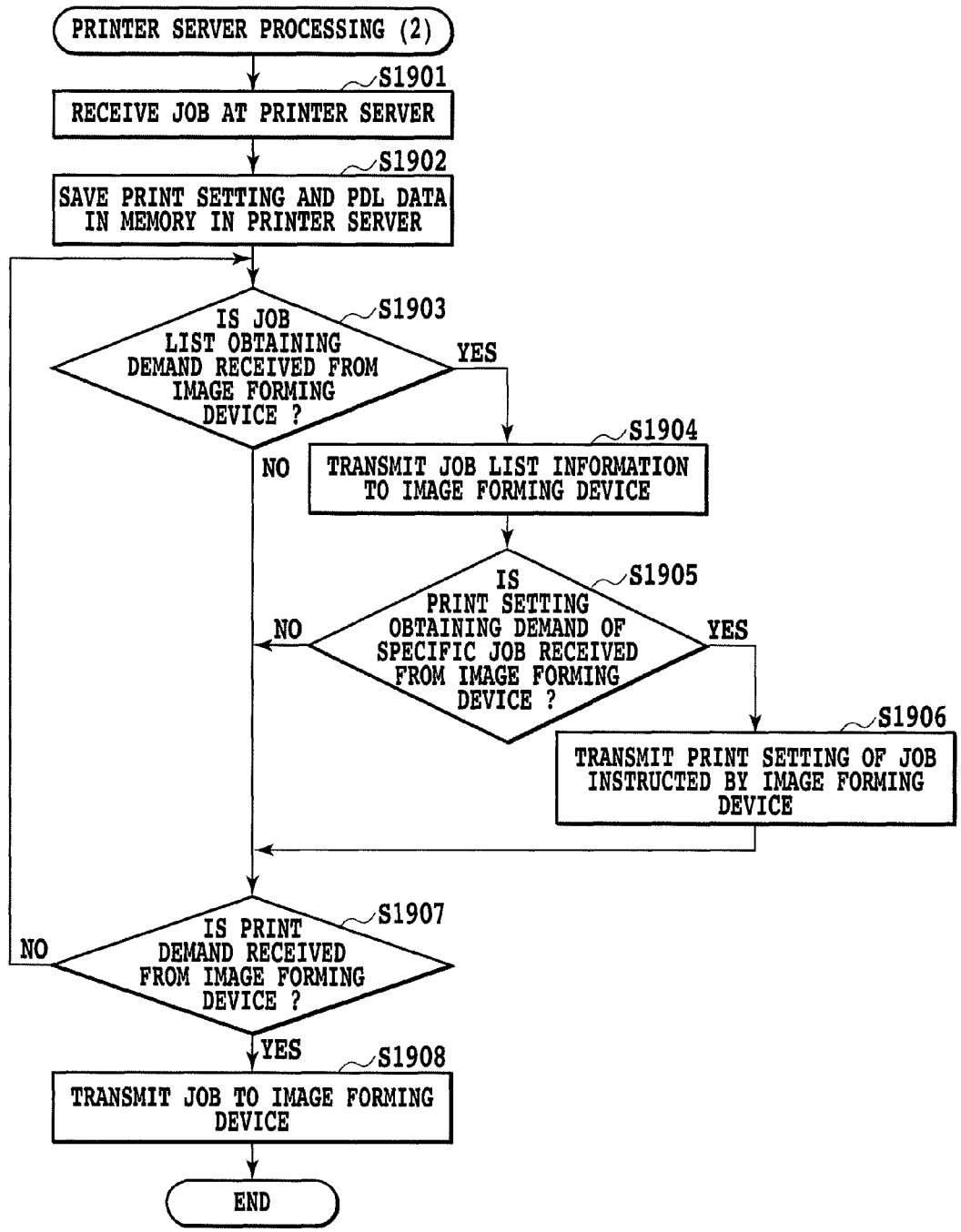
FIG. 9 is a flowchart showing the procedure of the processing by a printer server 102 according to a second embodiment of the present invention.

FIG. 9 is a flow chart showing the procedure in the printer server 102 according to the second embodiment. As apparent from comparison with FIG. 7 according to the first embodiment, step 1901 to step 1906 in FIG. 9 correspond to step 1701 to step 1706 in FIG. 7 and the content in the second embodiment is the same as in the first embodiment. Therefore, an explanation for step 1901 to step 1906 is omitted.

According to the second embodiment, after transmitting the print setting of the print job corresponding to the received print setting obtaining demand to the image forming device 103 (step 1906), a determination on whether or not a print demand is received from the image forming device is made (step 1907). That is, in the second embodiment, the printer server 102 does not execute the processing of reflecting the change to the print setting in the memory in response to the print setting changing demand from the image forming device corresponding to step 1707 and step 1708 in FIG. 7.

After step 1907, the process is the same as in the first embodiment and the control unit 102b determines whether or not the print demand is received from the image forming device 103. When the print demand is received, the process goes to step 1908 and when the print demand is not received, the process goes back to step 1903. At step 1908, the demanded print job is transmitted to the image forming device 103.

Figure 10B:
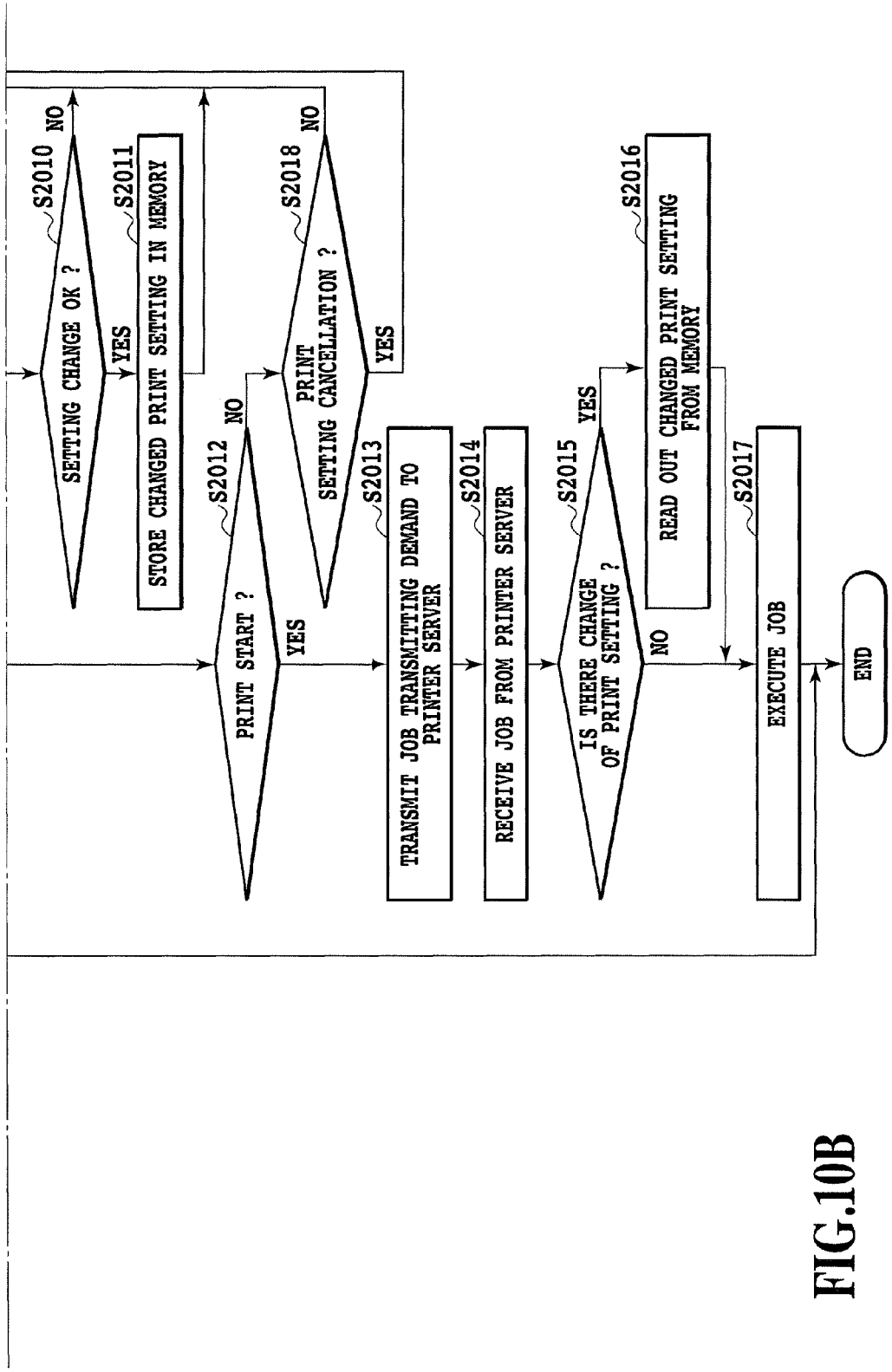
FIG. 10B is a flowchart showing the procedure of the changing processing for print settings in an image forming device 103 according to the second embodiment of the present invention.

FIG. 10A and FIG. 10B are flow chart showing the procedure in the changing processing in the print setting of the image forming device 103 according to the second embodiment.

As apparent from comparison with FIG. 8A and FIG. 8B according to the first embodiment, step 2001 to step 2010 in FIG. 10A correspond to step 1801 to step 1806 in FIG. 8A and the content in the second embodiment is the same as in the first embodiment. Therefore, an explanation for step 2001 to step 2010 is omitted.

As a result of determining whether or not a login user selects the OK button 1922 on the print setting changing screen 1900 (step 2010), in a case of selecting the OK button 1922, a changing demand of the print setting to the printer server 102 is not made unlike the first embodiment. At step 2011, the changed print setting is stored as it is in the memory unit in the image forming device 103. That is, at step 2011 the control unit 103b stores the change content added to the print setting of the selected print job as a new print setting corresponding to the print job in the memory unit of the image forming device 103. (similarly to a case of the first embodiment, the memory in this case is preferably an involatile memory in which written data do not disappear even in a case where power is not supplied) When storing the content in the memory in the image forming device is completed, the process goes back to step 2006.

At step 2012 the control unit 103b determines whether or not the login user selects the print start button 1903. When the login user selects it, the process goes to step 2013 and when the login user does not select it, the process goes to step 2018. At step 2018 the control unit 103b determines whether or not the login user selects the cancellation button 1905 on the print setting screen 1900. When the login user selects it, the process goes back to step 2005 and when the login user does not select it, the process goes back to step 2006. At step 2013 the control unit 103b transmits a print job transmitting demand to the printer server 102 so as to transmit the print job, and at step 2014 the control unit 103b receives the print job from the printer server 102. The process from step 2012 to here is the same as in the first embodiment.

In the first embodiment, after the print job is received from the printer server 102, the process goes to execution of the job (step 1815), but the second embodiment differs.

At step 2015 the control unit 103b determines whether or not the print setting is changed at step 2011. This determination is made by setting a flag showing that the change is added at the time of storing the changed print setting in the memory to check presence/absence of this flag. In a case where the print setting is changed, the process goes to step 2016, and in a case where the print setting is not changed, the process goes to step 2017.

At step 2016 the control unit 103b is configured to read out the changed print setting stored at step 2011 from the memory and use the read-out print setting instead of the print setting contained in the print job received from the printer server 102.

At step 2017 the control unit 103b executes the execution processing of the received print job. That is, when the print setting is not changed, the print processing is executed according to the print setting contained in the print job received from the printer server, and when the print setting is changed, the print processing is executed according to the changed print setting. It should be noted that, a detail of the execution processing for the print job is omitted since it is the same as the content already explained with reference to FIG. 11.

In this way, according to the second embodiment, the print setting in the printer server 102 is held as it is, and can be temporarily changed at printing in the image forming device 103 for printing. Since the change content made in the image forming device is not reflected to the print setting of the print job stored in the printer server 102, in a case of desiring a reprint according to the initial print setting, the initial print job can be used by once more having access to the printer server 102.

In the first and second embodiments, the printer server and the image forming device are explained assuming that they are separate and different devices as a typical construction. However, the present invention is not limited to such a construction, and the printer server 102 and the image forming device 103 may be integrally constructed. That is, a single image forming device may be provided with the construction and the function of both the printer server 102 and the image forming device 103.

(Other Embodiments)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001635, filed Jan. 7, 2009, which is hereby incorporated by reference herein in its entirety.

What is claimed is:

1. An image forming device in a printing system, the printing system including an information terminal for generating a print job composed of data and a print setting, and an information processing device for storing the print job, wherein the image forming device is configured to rasterize the data forming the print job stored in the information processing device to generate a raster image and to print the raster image according to the print setting, the image forming device comprising:

a print setting receiving unit configured to receive from the information processing device, only the print setting among a print job stored therein;

a changing unit configured to change the print setting of the print job received by the print setting receiving unit;

a memory unit configured to store the print setting of the print job changed by the changing unit;

a print job receiving unit configured to receive the print job;

a determining unit configured to determine whether the print setting of the print job received by the print job receiving unit is changed by the changing unit; and a printing unit configured to print data of the print job received by the print job receiving unit based on the print setting stored in the memory unit in a case where the print setting of the print job received by the print job receiving unit is determined by the determining unit as being changed, and to print data of the print job received by the print job receiving unit based on the print setting stored in the information processing device in a case where the print setting of the print job received by the print job receiving unit is determined by the determining unit as not being changed.

2. An image forming device according to claim 1, wherein, the printing unit is configured to determine whether or not generation of a preview image is selected in the print setting before rasterizing.

3. The image forming device according to claim 1, wherein the print setting is the setting reflected at the time of rasterizing the data.

4. An image forming method of an image forming device in a printing system, the printing system including an information terminal for generating a print job composed of data and print settings, and an information processing device for storing the print job, wherein the image forming device is configured to rasterize the data forming the print job stored in the information processing device to generate a raster image and to print the raster image according to the print setting, the image forming method comprising the steps of:

receiving from the information processing device, only the print setting among a print job stored therein;

changing the print setting of the print job received in the receiving step;

storing in a memory the print setting of the print job changed in the changing step;

receiving the print job;

determining whether the print setting of the print job received by the print job receiving step is changed by the changing step; and printing data of the print job received by the print job receiving step based on the print setting stored in the memory in a case where the print setting of the print job received by the print job receiving step is determined by the determining step as being changed, and printing data of the print job received by the print job receiving step based on the print setting stored in the information processing device in a case where the print setting of the print job received by the print job receiving step is determined by the determining step as not being changed.

5. A non-transitory computer readable storage medium on which is stored computer-executable code of a program for causing a computer to perform the image forming method according to claim 4.

* * * * *